(12) United States Patent
Wang (10) Patent No.: US 9,131,510 B2
(45) Date of Patent: Sep. 8, 2015

(54) WIRELESS COMMUNICATION METHODS AND APPARATUS

(71) Applicant: Kabushiki Kaisha Toshiba, Tokyo (JP)

(72) Inventor: Yue Wang, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 102 days.

(21) Appl. No.: 13/846,027

(22) Filed: Mar. 18, 2013

(65) Prior Publication Data

US 2013/0258939 A1    Oct. 3, 2013

(30) Foreign Application Priority Data

Mar. 28, 2012    (GB) .................................. 1205465.6

(51) Int. Cl.
    *H04W 72/08*    (2009.01)
    *H04W 40/12*    (2009.01)

(52) U.S. Cl.
    CPC .............. *H04W 72/08* (2013.01); *H04W 40/12* (2013.01)

(58) Field of Classification Search
    CPC . H04W 84/047; H04W 72/08; H04W 72/121; H04W 40/12; H04W 40/246; H04W 80/10; H04W 52/0209
    See application file for complete search history.

(56) References Cited

U.S. PATENT DOCUMENTS

| | | | |
|---|---|---|---|
| 7,684,337 | B2 | 3/2010 | Mehta et al. |
| 7,706,283 | B2 | 4/2010 | Mehta et al. |
| 2007/0165581 | A1 | 7/2007 | Mehta et al. |
| 2008/0025248 | A1* | 1/2008 | Naden ........................... 370/321 |
| 2008/0084856 | A1* | 4/2008 | Ramachandran ............. 370/342 |
| 2009/0147722 | A1 | 6/2009 | Ramachandran |
| 2010/0091669 | A1* | 4/2010 | Liu et al. ....................... 370/252 |
| 2010/0246480 | A1 | 9/2010 | Aggarwal et al. |
| 2010/0304665 | A1 | 12/2010 | Higuchi |
| 2011/0038274 | A1 | 2/2011 | Ikemoto et al. |

FOREIGN PATENT DOCUMENTS

| | | |
|---|---|---|
| GB | 2 458 540 A | 9/2009 |
| JP | 2007-195179 A | 8/2007 |

(Continued)

OTHER PUBLICATIONS

Office Action issued Mar. 4, 2014 in Japanese Patent Application No. 2013-064275 (with English language translation).
Combined Search and Examination Report issued Aug. 3, 2012 in United Kingdom Application No. GB1205465.6.

(Continued)

*Primary Examiner* — Jianye Wu
(74) *Attorney, Agent, or Firm* — Oblon, McClelland, Maier & Neustadt, L.L.P.

(57) ABSTRACT

In an embodiment a wireless relay device comprises a receiver configured to receive signals from at least a first wireless device and a second wireless device, and to extract, from a signal received from the first wireless device, an indication of a path metric for a path from a source node to the first wireless device, and from a signal received from the second wireless device, an indication of a path metric for a path from the source node to the second wireless device; a processor configured to select, using the extracted indications, a path from the source node to the wireless relay device and to determine a path metric for the selected path; a memory configured to store the path metric for the selected path; and a transmitter configured to transmit an indication of the path metric for the selected path to a third wireless device.

12 Claims, 10 Drawing Sheets

(56) References Cited

FOREIGN PATENT DOCUMENTS

| | | |
|---|---|---|
| JP | 2009-194566 | 8/2009 |
| JP | 2009-267532 A | 11/2009 |
| WO | WO 2006/137764 A1 | 12/2006 |
| WO | WO 2009/093406 A1 | 7/2009 |

OTHER PUBLICATIONS

Bo Gui, et al., "Routing Strategies in Multihop Cooperative Networks", IEEE Transactions on Wireless Communications, vol. 8, No. 2, Feb. 2009, pp. 843-855.

Office Action issued on Nov. 11, 2014 in the corresponding Japanese Patent Application No. 2013-064275 (with English Translation).

* cited by examiner

WIRELESS COMMUNICATION METHODS AND APPARATUS

CROSS REFERENCE TO RELATED APPLICATION(S)

This application is based upon and claims the benefit of priority from UK Patent Application GB1205465.6 filed on 28 Mar. 2012; the entire contents of which is incorporated herein by reference.

FIELD

Embodiments described herein relate generally wireless communications via a relay node in a wireless communication network, and to route selection in such a network.

BACKGROUND

Machine to machine (M2M) communications is an emerging communication paradigm that has found applications in smart gird and vehicular communications.

Multi-hop relay networks have been identified as a network structure capable of accommodating the ever increasing demand of information exchange over a large number of nodes in M2M communications. In multi-hop relay networks, one or several intermediate relay nodes are employed to receive the information from the source node and then forward it to the other relay nodes or the destination node.

In some multi-hop relay networks, the relay nodes simply amplify the signals from the source node or from the other relay nodes with a fixed gain, and then forward the amplified information to the other relays or the destination. Such a relay technique is referred to as the "fixed-gain amplify-and-forward" technique. In the case when the received signals at the relays are amplified by a gain that depends on the instantaneous power of the channel, the transmission protocol is referred to as "variable-gain amplify-and-forward". In other relay systems, the received signals are detected, re-encoded, and then forwarded at the relay nodes. Such a relay protocol is referred to as "decode-and-forward". It is known that decode-and-forward yields a better performance than amplify-and-forward, while subject to a higher complexity at the relay nodes. In some application scenarios where simple relay nodes are desired, amplify-and-forward, especially fixed-gain amplify-and-forward techniques are more attractive.

With an ever increasing demand of information exchange over a huge number of nodes, M2M communications faces a number of challenges including how to select, among all possible transmission routes, the best route for signal transmission from the source to the destination. Intuitively, assuming channel state information (CSI) of all the transmission links is known at each node, an exhaustive search over all the possible routes can be performed to find the optimum route. However, this is not feasible in practice because of the prohibitive complexity introduced as the number of relays as the number of hops increases.

BRIEF DESCRIPTION OF THE DRAWINGS

In the following, embodiments are described, by way of example only, with reference to the accompanying drawings in which.

DETAILED DESCRIPTION

In an embodiment, a wireless relay device comprises a receiver configured to receive signals from at least a first wireless device and a second wireless device, and to extract, from a signal received from the first wireless device, an indication of a path metric for a path from a source node to the first wireless device, and from a signal received from the second wireless device, an indication of a path metric for a path from the source node to the second wireless device; a processor configured to select, using the extracted indications, a path from the source node to the wireless relay device and to determine a path metric for the selected path; a memory configured to store the path metric for the selected path; and a transmitter configured to transmit an indication of the path metric for the selected path to a third wireless device.

In an embodiment, the processor is configured to use the extracted indications to determine, an optimal path, from a set of paths comprising the path from the source node to the wireless relay device via the first wireless device and the path from the source node to the wireless relay device via the second wireless device, and to select the optimal path.

In an embodiment, the processor is configured to use indications of channel state information for, respectively, a path between the first wireless device and the wireless relay device, and a path between the second wireless device and the wireless relay device and the extracted indications to select a path from the source node to the wireless relay device.

In an embodiment, the processor is configured to use indications of the effective gain for, respectively, a path between the first wireless device and the wireless relay device, and a path between the second wireless device and the wireless relay device and the extracted indications to select a path from the source node to the wireless relay device.

In an embodiment, the processor is configured to determine the path metric for the selected path as the effective gain for the path from one of the first and the second wireless device to the wireless relay device multiplied by the path metric for the path from the source node to the one of the first and the second wireless device minus a quantity proportional to the noise power on the wireless relay device.

In an embodiment, the processor is configured to calculate a set of products, the set of products comprising for each of the first and the second wireless device the product of the effective channel gain for the path from the wireless device to the wireless relay device multiplied with the path metric for the path from the source node to that wireless device, to compare the products of the set of products to determine a largest product, and to select the path having the largest product as the selected path.

In an embodiment, the wireless relay device is configured as an amplify-and-forward wireless relay device.

In an embodiment, the wireless relay device is configured as a fixed gain amplify-and-forward wireless relay device.

In an embodiment a wireless network comprises a source node; a destination node; and a plurality of wireless relay devices according to embodiments, wherein the destination node is configured to receive indications of path metrics from at least a first wireless relay device and a second wireless relay device of the plurality of wireless relay devices; and determine, using the received path metrics, an optimal path from the source node to the destination node.

In an embodiment, the wireless network is configured to send a message along the optimal path from the source node to the destination node.

In an embodiment, a wireless communication method comprises receiving, at a wireless relay device, signals from at least a first wireless device and a second wireless device, wherein a signal received from the first wireless device comprises an indication of a path metric for a path from a source node to the first wireless device and a signal received from the second wireless device comprises an indication of a path metric for a path from the source node to the second wireless device; using the indications received from the first wireless device and the second wireless device to select a path from the set of paths comprising the path from the source node to the wireless relay device via the first wireless device and the path from the source node to the wireless relay device via the second wireless device; determining a path metric for the selected path; and transmitting an indication of the path metric for the selected path to a third wireless device.

In an embodiment the wireless communication method according comprises determining an optimal path from the set of paths and selecting the optimal path.

In an embodiment, determining a path metric for the selected path comprises multiplying the effective gain for the path from one of the first and the second wireless device to the wireless relay device by the path metric for the path from the source node to the one of the first and the second wireless device and subtracting a quantity proportional to the noise power on the wireless relay device.

In an embodiment, selecting a path comprises calculating a set of products, the set of products comprising for each of the first and the second wireless device the product of the effective channel gain for the path from the wireless device to the wireless relay multiplied with the path metric for the path from the source node to that wireless device, comparing the products of the set of products to determine a maximum product, and selecting the path having the maximum product.

In an embodiment, a method of selecting a path from a source node to a destination node in a wireless network comprises: at a first relay node, determining a maximum path metric for paths from the source node to the first relay node, selecting the path having the maximum path metric as an optimum path from the source node to the first relay node, at a second relay node, determining a maximum path metric for paths from the source node to the second relay node, selecting the path having the maximum path metric as an optimum path from the source node to the second relay node, receiving an indication of the path metric for the optimum path from the source node to the first relay node and an indication of the path metric for the optimum path from the source node to the second relay node at the destination node; determining, at the destination node, the path from the source node to the destination node having the maximum path metric using the indication of the path metric for the optimum path from the source node to the first relay node and the indication of the path metric for the optimum path from the source node to the second relay node at the destination node; and selecting the path having the maximum path metric as the optimum path from the source node to the destination node.

In an embodiment, the method further comprises transmitting a message along the optimum path.

One embodiment provides a computer program product comprising computer executable instructions which, when executed by a processor, cause the processor to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

Figure 1:
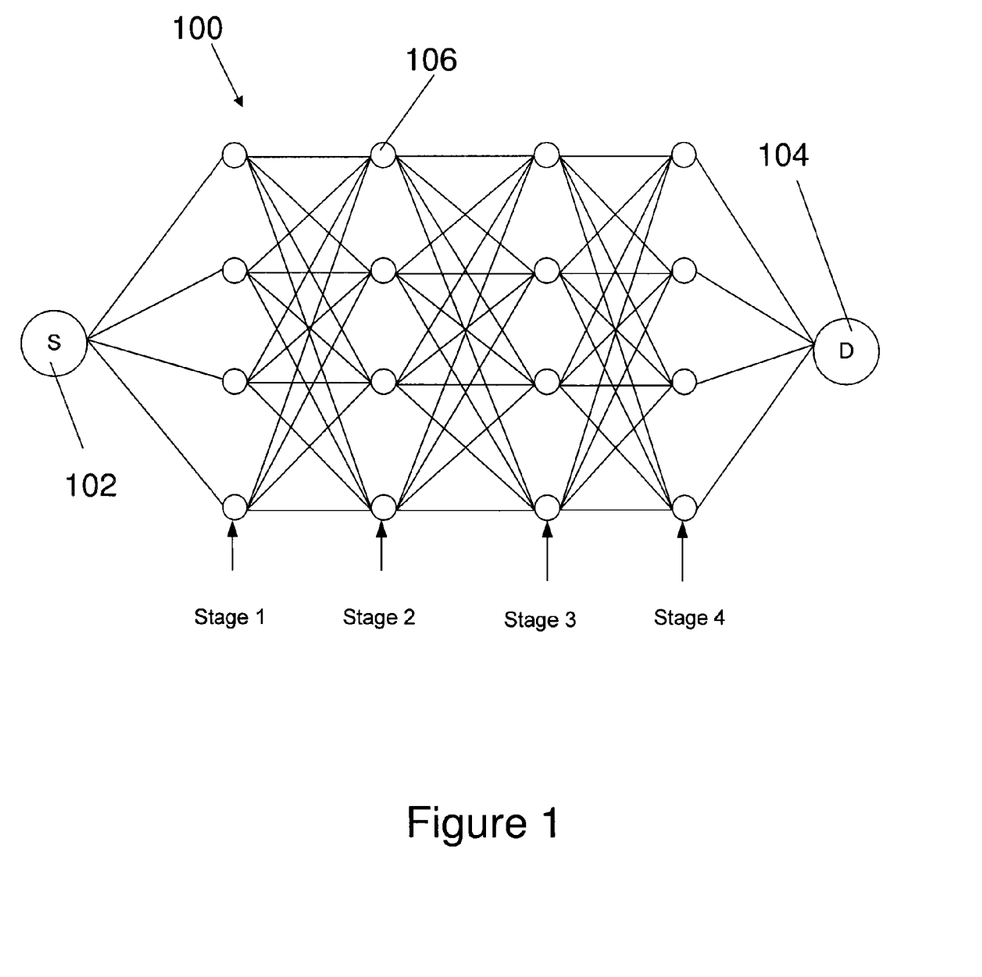
FIG. 1 illustrates a multi-hop relay network according to an embodiment.

FIG. 1 shows an embodiment of a multi-hop relay network 100. The network 100 has a source node 102, a destination node 104 and four relay stages. At each relay stage there are four relay nodes 106. In this embodiment the relay protocol is amplify-and-forward. Embodiments of the present invention relate to methods for finding an optimal path from the source node 102 to the destination node 104 such that the outage probability is minimised.

The multi-hop network shown in FIG. 1 may be generalised to an M-hop relay system with M−1 relay stages. At each stage, there are multiple (for example, L) relay nodes. The problem of finding the optimal path from the source to the destination is then finding the optimal path, among the $I=L^{M-1}$ paths, such that the outage probability, given by $$P_{out} = Pr(\gamma_{e2e} \leq \gamma_{th}) \quad (1)$$

is minimized, where $\gamma_{e2e}$ is the end-to-end SNR for the selected route, and $\gamma_{th}$ is a predefined threshold. Selecting the route with the minimum outage probability is therefore equivalent to selecting the route with the maximum end-to-end SNR, i.e., the ith route is selected such that $$\gamma^{(i)} = \max(\gamma^{(1)}, \gamma^{(2)}, \ldots, \gamma^{(I)}) \quad (2)$$

where $\gamma^{(i)}$ is the end-to-end SNR for the ith path.

For a given route i, the end-to-end SNR from the source to the destination is given by $$\gamma^{(i)} = \frac{\prod_{m=1}^{M}(A_{m-1}^{(i)}|h_m^{(i)}|)^2}{\sum_{m=1}^{M}\rho_m^{(i)}\prod_{j=m+1}^{M}(A_{j-1}^{(i)}|h_j^{(i)}|)^2}\bar{\gamma} \quad (3)$$

In the equation above, $\rho_m^{(i)} = N_m^{(i)}\bar{\gamma}$, where $N_m^{(i)}$ is the power of the white Gaussian noise on the node that consists the ith path at the mth stage, and $\bar{\gamma}$ is the average SNR per hop.

In addition, $h_m^{(i)}$ is the channel on the ith path between the (m−1)th stage and the mth stage. $h_m^{(i)}$ is a complex number defining the channel transfer characteristic. It may be considered to be the impulse response of a flat-fading system if time dispersion of the transmitted signal is not encountered.

Embodiments can be extended to frequency-selective fading systems by using suitable multi-carrier methods, such as orthogonal frequency-division multiplexing (OFDM). In this case, each subcarrier may be considered independently when performing relaying, or $h_m^{(i)}$ may be taken to be a norm of the channel impulse response or, equivalently, a norm of the channel frequency response. It is noted that a norm can be used since phase information is not required, only amplitude information.

$A_m^{(i)}$ is the corresponding amplification factor at the mth stage. When an amplify and forward protocol is used, the wireless node at the mth stage of the ith path scales the amplitude of the message by this factor prior to transmitting it to the wireless node at the (m+1)th stage. This amplification can be accomplished in a number of ways, for example, an analogue operational amplifier circuit may be used, or the signal may be digitally scaled prior to digital to analogue conversion. The amplification factors may be specified according to a number of different methods. Two examples of such methods are variable gain amplify and forward and fixed gain amplify and forward.

In an embodiment, a fixed-gain amplify-and-forward protocol is used and the amplification factor is given by:

$$A_m^{(i)} = \frac{1}{\sqrt{E|h_m^{(i)}|^2 + N_m^{(i)}}} \quad (4)$$

where E denotes expectation.

In the following, the quantities $X_m^{(i)}$ and $\sigma(i)_m$ are defined and it is shown that $\gamma^{(i)}$ can be determined from these quantities.

Let $$X_m^{(i)} = (A_{m-1}^{(i)}|h_m^{(i)}|)^2 \quad (5)$$

and $$\sigma_m^{(i)} = N_m^{(i)}\gamma_{th} \quad (6)$$

$X_m^{(i)}$ is the equivalent gain of the channel, taking into account the amplification factor applied at the previous stage and the channel through which the amplified signal is conveyed. In an embodiment $X_m^{(i)}$ is computed as stated in the above. In an alternative embodiment, in which information of the amplification factor from the previous stage is unknown, the receiver relay node may use a pilot signal to estimate $X_m^{(i)}$. $\sigma_m^{(i)}$ is a scaled version of the noise power at the mth relay on the ith path. This is determined by multiplying the outage threshold $\gamma_{th}$ by the actual noise variance, which can be estimated at each node independently. The outage threshold $\gamma_{th}$ is a design parameter.

Equation (3) above can be rearranged to show that for a given path (e.g., the ith path), the probability that $\gamma^{(i)}$ is smaller than or equal to a predefined threshold is given by $$P(\gamma^{(i)} \leq \gamma_{th}) = P\left(\prod_{m=1}^{M} X_m^{(i)} - \sum_{m=1}^{M-1}\sigma_m^{(i)}\prod_{j=m+1}^{M}X_j^{(i)} \leq \sigma_M^{(i)}\right) = \quad (7)$$

$$P((((X_1^{(i)} - \sigma_1^{(i)})X_2^{(i)} - \sigma_2^{(i)})X_3^{(i)} - \ldots \sigma_{M-1}^{(i)})X_M^{(i)} \leq \sigma_M^{(i)})$$

The outage probability $P_{out}$ is given by $$P_{out} = Pr(\max(\gamma^{(1)}, \gamma^{(2)}, \ldots, \gamma^{(I)}) \leq \gamma_{th}) = Pr(\gamma^{(1)} \leq \gamma_{th}, \gamma^{(2)} \leq \gamma_{th}, \ldots, \gamma^{(I)} \leq \gamma_{th}) \quad (8)$$

The paths are not separable as there are overlap links among the paths.

In the following, a simple network example is used to show how the optimal paths are found in an embodiment of an amplify-and-forward multi-hop relay network to minimize the outage probability.

Figure 2:
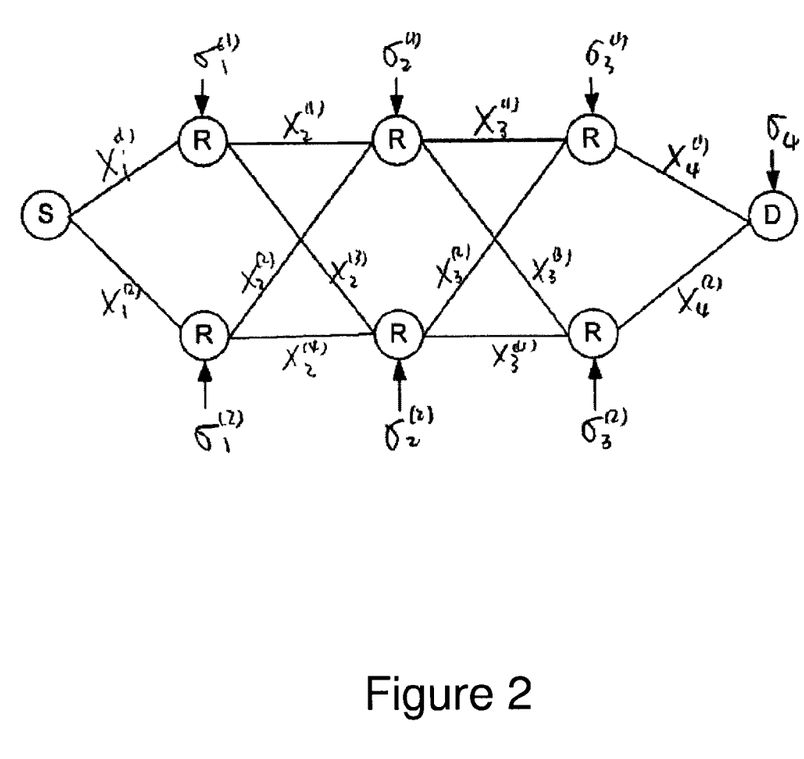
FIG. 2 illustrates a multi-hop relay network according to an embodiment showing parameters indicating effective gain for channels between stages and an indication of a scaled noise power at each stage.

The network considered below has 4 hops and 3 stages, with two relays at each stage. Such a network is illustrated in FIG. 2, where the corresponding parameters ($X_m^{(i)}$ and $\sigma_m^{(i)}$) for each stage at each node/link are also given.

It is known from the equations given above that the outage probability is given by $$P_{out} = Pr(((X_1^{(1)} - \sigma_1^{(1)})X_2^{(1)} - \sigma_2^{(1)})X_3^{(1)} - \sigma_3^{(1)})X_4^{(1)} \leq \sigma_4, \quad (9)$$
$$(((X_1^{(1)} - \sigma_1^{(1)})X_2^{(1)} - \sigma_2^{(1)})X_3^{(3)} - \sigma_3^{(2)})X_4^{(2)} \leq \sigma_4,$$
$$(((X_1^{(1)} - \sigma_1^{(1)})X_2^{(3)} - \sigma_2^{(2)})X_3^{(2)} - \sigma_3^{(1)})X_4^{(1)} \leq \sigma_4,$$
$$(((X_1^{(1)} - \sigma_1^{(1)})X_2^{(3)} - \sigma_2^{(2)})X_3^{(4)} - \sigma_3^{(2)})X_4^{(2)} \leq \sigma_4,$$
$$(((X_1^{(2)} - \sigma_1^{(2)})X_2^{(2)} - \sigma_2^{(1)})X_3^{(1)} - \sigma_3^{(1)})X_4^{(1)} \leq \sigma_4,$$
$$(((X_1^{(2)} - \sigma_1^{(2)})X_2^{(2)} - \sigma_2^{(1)})X_3^{(3)} - \sigma_3^{(2)})X_4^{(2)} \leq \sigma_4,$$
$$(((X_1^{(2)} - \sigma_1^{(2)})X_2^{(4)} - \sigma_2^{(2)})X_3^{(2)} - \sigma_3^{(1)})X_4^{(1)} \leq \sigma_4,$$
$$(((X_1^{(2)} - \sigma_1^{(2)})X_2^{(4)} - \sigma_2^{(2)})X_3^{(4)} - \sigma_3^{(2)})X_4^{(2)} \leq \sigma_4)$$

After some mathematical manipulations, the outage probability can be rewritten as $$P_{out} = Pr(\max(AX_3^{(1)} - \sigma_3^{(1)}, BX_3^{(2)} - \sigma_3^{(1)})X_4^{(1)} \leq \sigma_4, \max \\ (AX_3^{(3)} - \sigma_3^{(2)}, BX_3^{(4)} - \sigma_3^{(2)})X_4^{(2)} \leq \sigma_4) \quad (10)$$

where $$A = \max((X_1^{(1)} - \sigma_1^{(1)})X_2^{(1)} - \sigma_2^{(1)}, (X_1^{(2)} - \sigma_1^{(2)})X_2^{(2)} - \sigma_2^{(1)}) \quad (11)$$

and $$B = \max((X_1^{(1)} - \sigma_1^{(1)})X_2^{(2)} - \sigma_2^{(2)}, (X_1^{(2)} - \sigma_1^{(2)})X_2^{(4)} - \sigma_2^{(1)}) \quad (12)$$

It is noted that in the calculation above, the values of A and B are used numerous times and further, once a comparison has taken place to determine the maximum, for example in the calculation of A or B, in later calculations, just the maximum quantity is required and the non-maximum quantity can be discarded.

One can therefore deduce the following algorithm to find the optimal path for amplify-and-forward multi-hop relay networks with arbitrary number of hops and relays.

Consider a general multi-hop network with M stages, where $I_m$ relays are present at the mth stage. The zeroth stage is taken to be the source ($I_0=1$). The Mth stage is taken to be the destination ($I_M=1$). Thus, $I_{m-1}$ paths lead from each relay in stage m−1 to each relay in stage m. For clarity, each such path is denoted as a branch. There exist $I_{m-1}I_m$ branches from the (m−1)th stage to the mth stage. In this embodiment the branches are labelled sequentially in the pattern indicated in FIG. 2, but other labelling conventions can be used. Thus, the ith branch gain from the (m−1)th stage to the mth stage is $X_m^{(i)}$. Moreover, the rth relay in the mth stage is affected by noise, which has a power (scaled by the outage threshold $\gamma_{th}$) denoted by $\sigma_m^{(r)}$.

In this embodiment, at the mth relay stage, $I_{m-1}$ branches (one per relay) connect the (m−1)th relay stage to the rth relay (for $r=1, \ldots, I_m$). For the rth relay at the mth stage, these branches have gains $X_m^{((r-1)lm-1+1)}, \ldots, X_m^{(rlm-1)}$.

Moreover, a path metric is associated with each node at the (m−1)th stage, which is a measure of the quality of choosing said node to route information through. Denote the path metric associated with the qth node at the (m−1)th stage as $Q_{m-1}^{(q)}$, with $Q_0=1$ denoting the path metric at the source. The path metric is updated at the rth node of the mth relay stage according to the following equation:

$$Q_m^{(r)} = \max_q \{Q_{m-1}^{(q)} X_m^{((r-1)lm-1+q)}\} - \sigma_m^{(r)} \quad (13)$$

In words, the path metric is updated at the rth node of the mth relay stage by considering the product of each path metric and corresponding branch gain, maximising this quantity, and then subtracting the scaled noise power for the rth node. The path corresponding to the new metric is retained in memory at the mth relay stage.

A person skilled in the art would recognise that the maximisation operation could also be performed after subtracting the scaled noise power without altering the outcome of the update procedure.

A method according to an embodiment is summarised as follows. Starting from the second stage, at each stage for each node, calculate the corresponding path metrics for each path, compare the path metrics for the L incoming paths for each node, reserve the path that has the largest path metric while discarding all the others. Therefore, only one route is reserved for each node at a given stage. This process repeats until the destination node is arrived at. The algorithm then traces back to find the optimal route and outputs the survivor path.

Below an example of the above method is described with reference to FIGS. 3a-g.

Figure 3A:
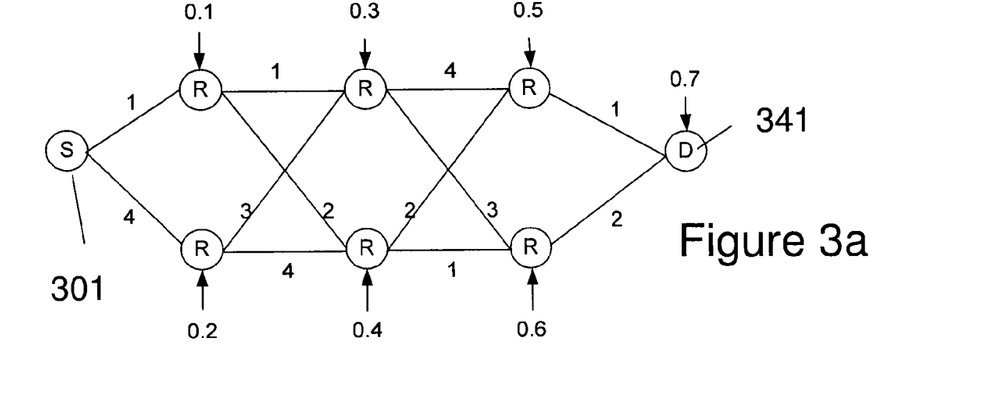
FIGS. 3a-3g illustrate steps in a method of selecting a path from a source node to a destination node according to an embodiment.

FIG. 3a shows example values for the variables used in the determination of an optimum path for transmitting a message through a network 300 from the source node 301 to the destination node 341.

Figure 3B:
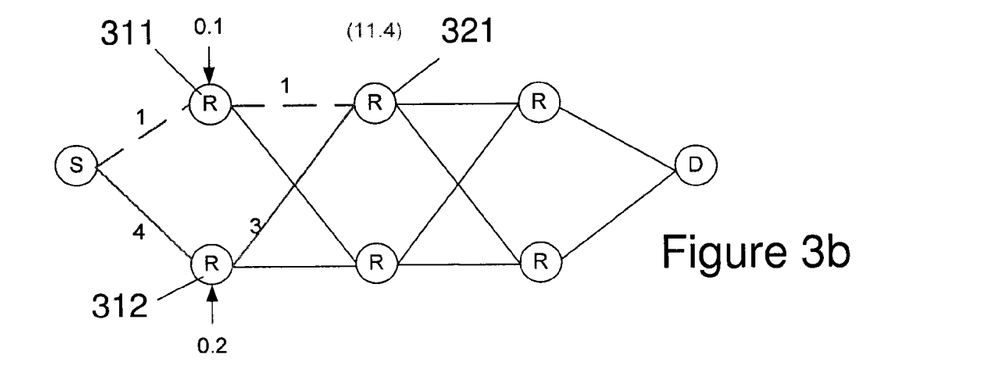

FIG. 3b shows the first step in the method. The first step is to calculate the path metrics for the two incoming paths for the first node 321 at the second stage. The path metric for the path via the first node 311 at the first stage is (1−0.1)*1 and the path metric for the path via the second node 312 at the first stage is (4−0.2)*3. The two path metrics are compared and the second incoming path for the first node 321 at stage 2 is selected (the path via the second node 312), and an output of (4−0.2)*3=11.4 is put in the memory of the first node 321. The path via the first node 311 in the first stage is discarded and is shown as a dashed line in FIG. 3b.

Figure 3C:
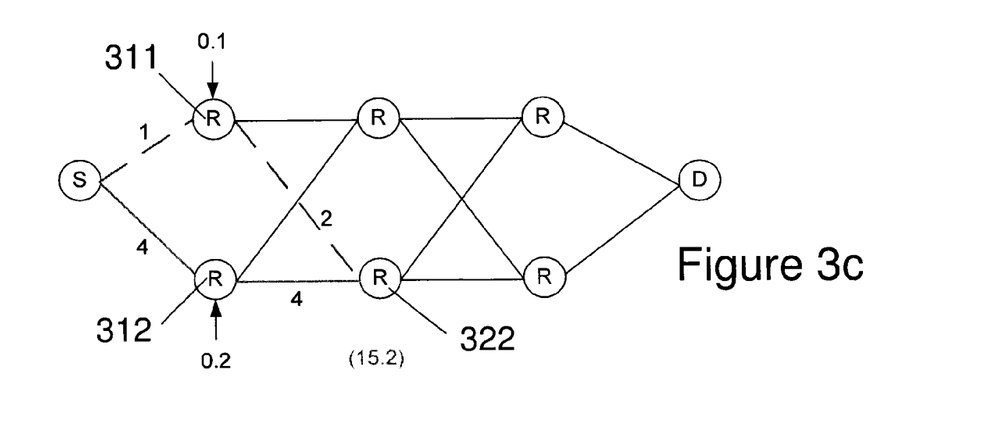

FIG. 3c shows the second step in the method. In the second step path metrics for the two incoming paths for the second node 322 are calculated. These are (1−0.1)*2 for the path via the first node 311 at the first stage and (4−0.2)*4 for the path via the second node 312 at the first stage. These are then compared and the second incoming path for the second node at stage 2 is selected, that is the path via the second node 312 at the first stage. An output of (4−0.2)*4=15.2 is put in the memory of the second node 322 at the second stage.

Figure 3D:
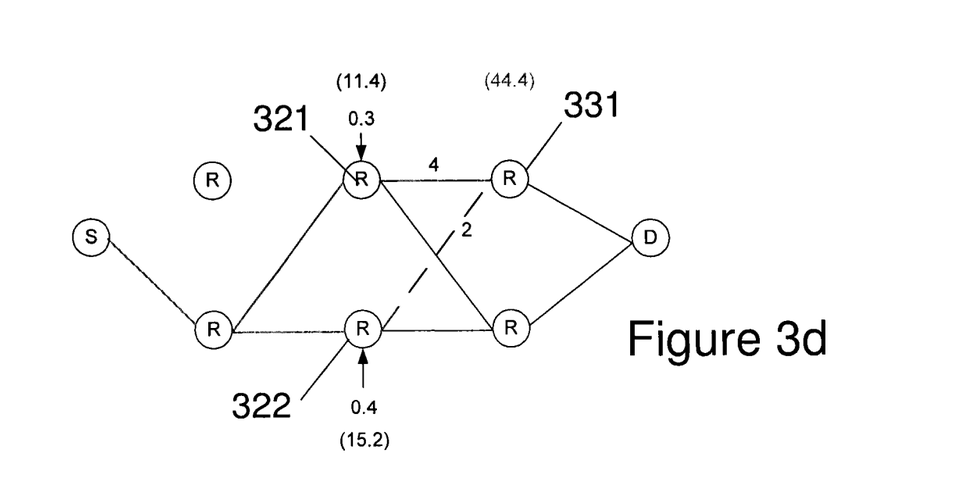

FIG. 3d shows the third step in the method. The path metrics for the two incoming paths for the first node 331 at the third stage are computed. These are computed using the path metrics calculated by the nodes in the previous stage. The path metrics are calculated as (11.4−0.3)*4 for the path via the first node 321 in the second stage and as (15.2−0.4)*2 for the path via the second node 322 in the second stage. The calculated path metrics are compared and the first incoming path for the first node at stage 3 (the path via the first node 321 in the second stage) is selected, and an output of (11.4−0.3)*4=44.4 is put in the memory of the first node 331.

Figure 3E:
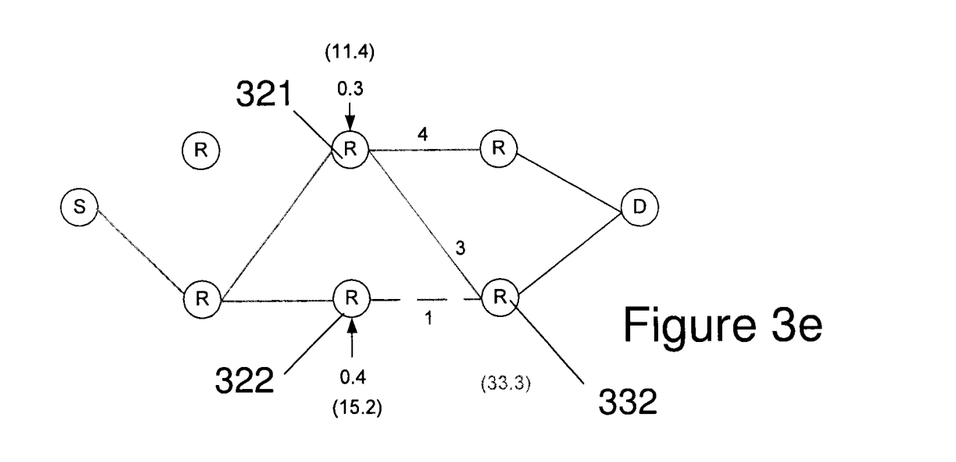

FIG. 3e shows the fourth step in the method. The path metrics for the two incoming paths for the second node 332 at the third stage are calculated. These are calculated as (11.4−0.3)*3 for the path via the first node 321 in the second stage and as (15.2−0.4)*1 for the second node in the second stage 322. The calculated path metrics are compared and the first incoming path (that is the path via the first node 321 at the second stage) for the second node 332 at stage 3 is selected, and an output of (11.4−0.3)*3=33.3 is put in the memory of the second node 332.

Figure 3F:
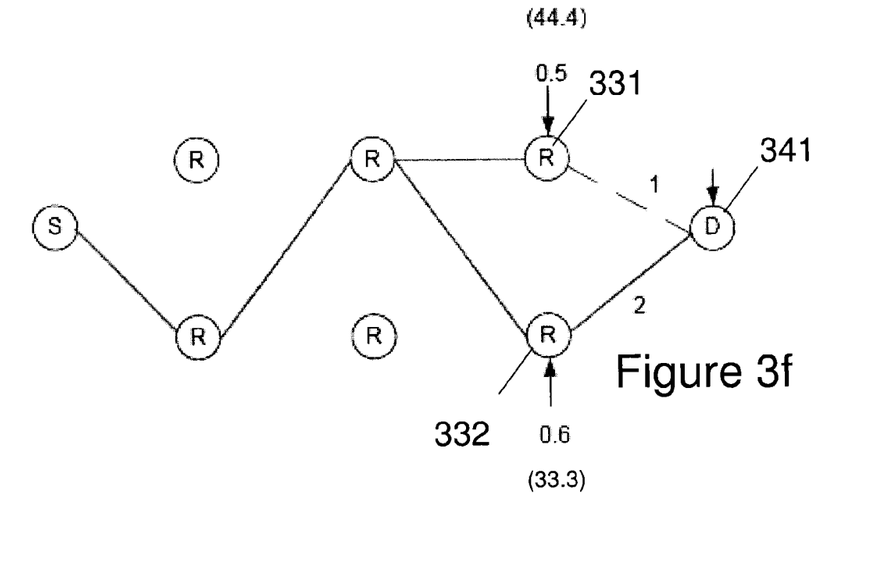

FIG. 3f shows the fifth step. In the fifth step, the path metrics for the two incoming paths for the destination node 341 at the final stage are calculated. These are (44.4−0.5)*1 for the path via the first node 331 at the third stage and (33.3−0.6)*2 for the path via the second node 332 at the third stage. These two path metrics are compared and the second incoming path (the path via the second node 332) for the destination node 341 is selected.

Figure 3G:
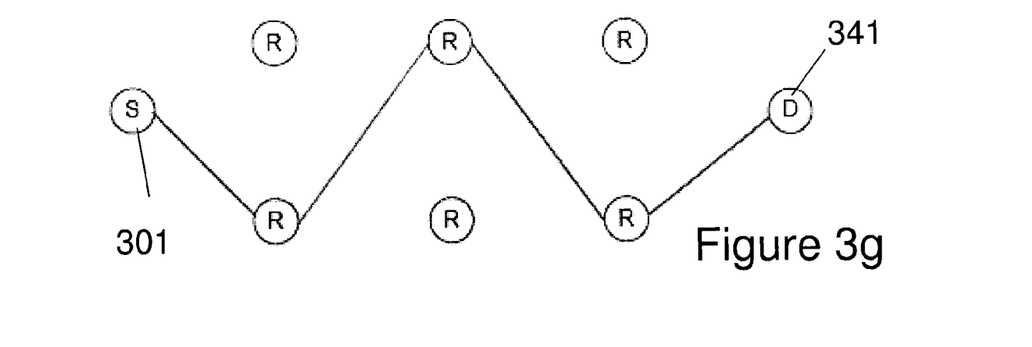

FIG. 3g shows the sixth step. In the sixth step, the survivor path is traced back and selected as the optimal route.

It is noted that only the parameters shown in the figures are required for each of the steps. So each node only requires information about the channel to the preceding nodes and the path metric for the path up to the preceding node.

Figure 4:
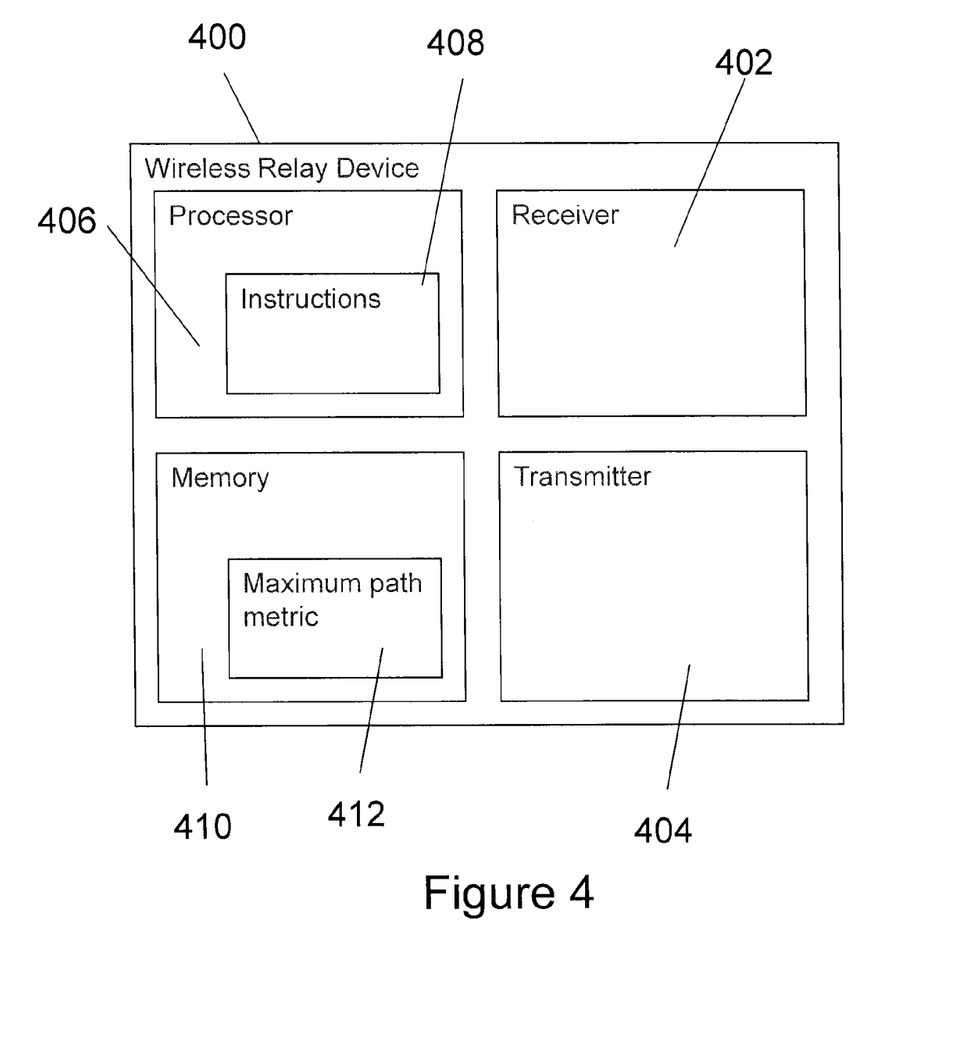
FIG. 4 is a schematic of a wireless relay node according to an embodiment.

FIG. 4 shows a wireless relay device 400 according to an embodiment. The wireless relay device 400 has a receiver 402 and a transmitter 404. In use, the wireless relay device receives signals at the receiver 402 and transmits signals based on the received signals with the transmitter 404. In embodiments, the wireless relay device 400 is an amplify-and-forward relay device and includes an amplifier to amplify the received signal before it is transmitted.

The wireless relay device 400 comprises a processor 406 which is operable to execute machine code instructions. The processor 406 is shown executing instructions 408 for path metric calculation in accordance with the methods described above. The wireless relay device 400 comprises a memory 410 which is stores an indication 412 of the maximum path metric calculated according to the methods described above.

In use, the wireless relay device 400 receives indications from other wireless devices, which may be other wireless relay devices or may be a device acting as a source node. The indications include a path metric for a message to be transmitted through a wireless network of which the wireless relay device 400 is a part. The processor 406 of the wireless relay device uses the indications to determine the maximum path metric for all of the incoming paths and stores an indication of the maximum path metric in the memory 410. The transmitter 404 transmits an indication of the maximum path metric to other nodes of the wireless network.

Thus the wireless relay device 400 facilitates the selection of a path through the wireless network. The wireless relay device may store an indication of the path having the maximum path metric to facilitate tracing back of the optimal path once the calculation has reached the proposed destination node.

While the path metric calculation instructions are illustrated as a distinct software element, the reader will appreciate that software can be introduced to a computer in a number of different ways. For instance, a computer program product, consisting of a storage medium could be introduced to a computer, so that stored instructions can then be transferred to the computer. Equally, a signal could be sent to the computer bearing such instructions. Furthermore, in introducing a computer program product, the reader will appreciate that a piece of software may be composed of a number of components, some of which may be new, and others of which may be assumed to be provided in the computer already. For instance, a computer might be reasonably assumed to be supplied with an operating system of known type, and a computer program may be developed on the basis of the presence of such an operating system. The interaction between the computer program developed in that way, and facilities of the operating system, would lead to the definition of a communications facilities element such as illustrated in FIG. 4. Thus, any computer program product may be developed as a new, stand-alone product, or as a plug-in to existing products.

Figure 5:
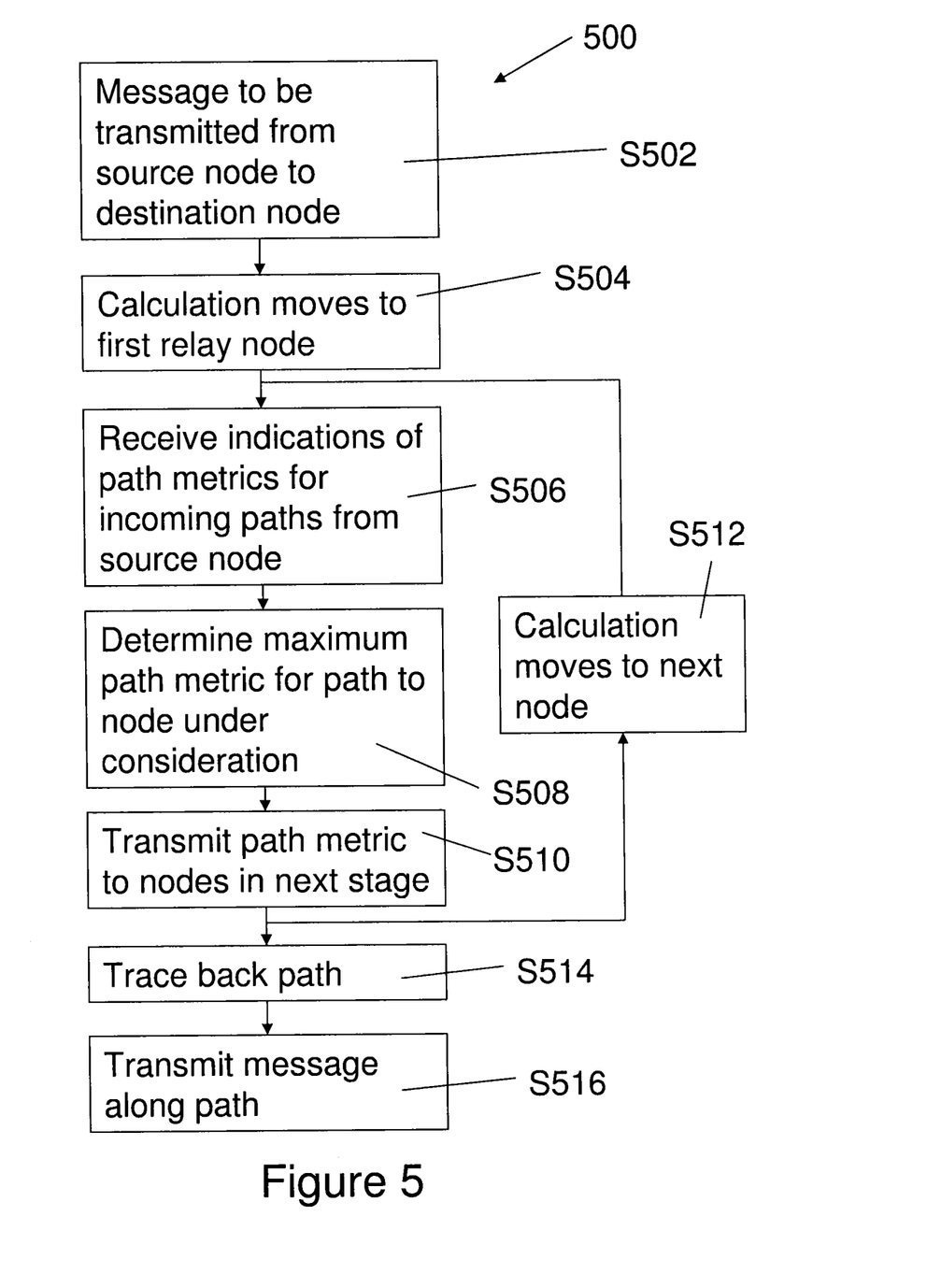
FIG. 5 is a flowchart of a method of selecting a path in a wireless network according to an embodiment.

FIG. 5 is a flow chart illustrating a method 500 of transmitting a message from a source node to a destination node according to an embodiment.

In step S502 the method starts when the source node requires a message to be transmitted to the destination node.

In step S504, the calculation moves to the first relay node. In step S506, the relay node receives indications of path metrics for paths from the source node to the node under consideration.

In step S508, the relay node determines the maximum path metric for a path from the source node to the relay node under consideration. This may be determined using equation (13) described above.

In step S510, the maximum path metric is transmitted to the nodes in the next stage.

If the next stage includes the destination node, then the calculation moves to step S514 which is carried out by the destination node. If the next stage does not include the destination node then the method moves to the next relay node in S512 and steps S506-S510 are repeated at that relay node.

When step S514 is reached (when the calculation reaches the destination node), the path having the maximum path metric is determined and traced back to the source node from the destination node. Each node may store an indication of the relay node in the previous stage that corresponds to the path having the maximum path metric to facilitate the tracing back of the optimum path.

Once the optimum path has been traced back, the message is transmitted from the source node to the destination node in step S516.

For a network with M hops and L relay nodes at each hop, with an exhaustive search, there are $L^{(M-1)}$ paths to compare. For each path, the end-to-end SNR needs to be computed ($\gamma^{(i)}$), and global knowledge of the channel state information for each link at each stage is required in order to compute these SNR values and perform the comparisons.

In embodiments using the proposed path selection algorithm, in the intermediate M−2 stages, $L^2$ comparisons are needed for each stage, and L comparisons are needed for the last stage at the destination node. The total number of comparisons are therefore $L^2(M-2)+L$, which is much smaller than $L^{(M-1)}$ especially in large scale networks when L and M are large.

Figure 6:
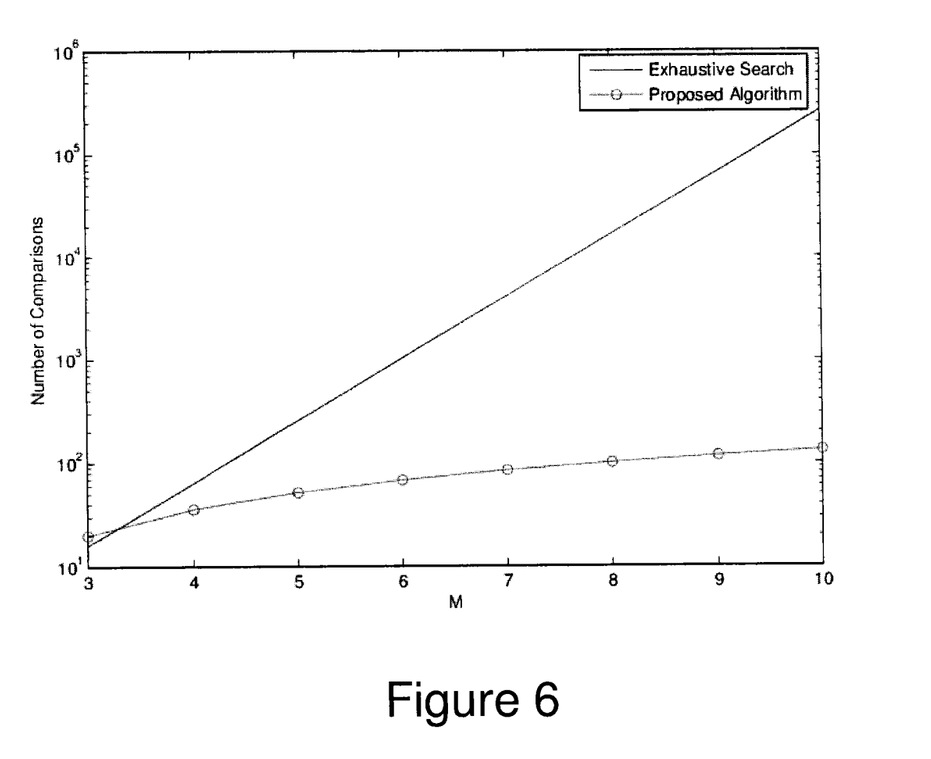
FIG. 6 is a graph showing the number of comparisons required for different numbers of hops for exhaustive search and the path selection algorithm used in embodiments.

FIG. 6 illustrates the number of comparisons required for different M for exhaustive search and the path selection algorithm used in embodiments.

Figure 7:
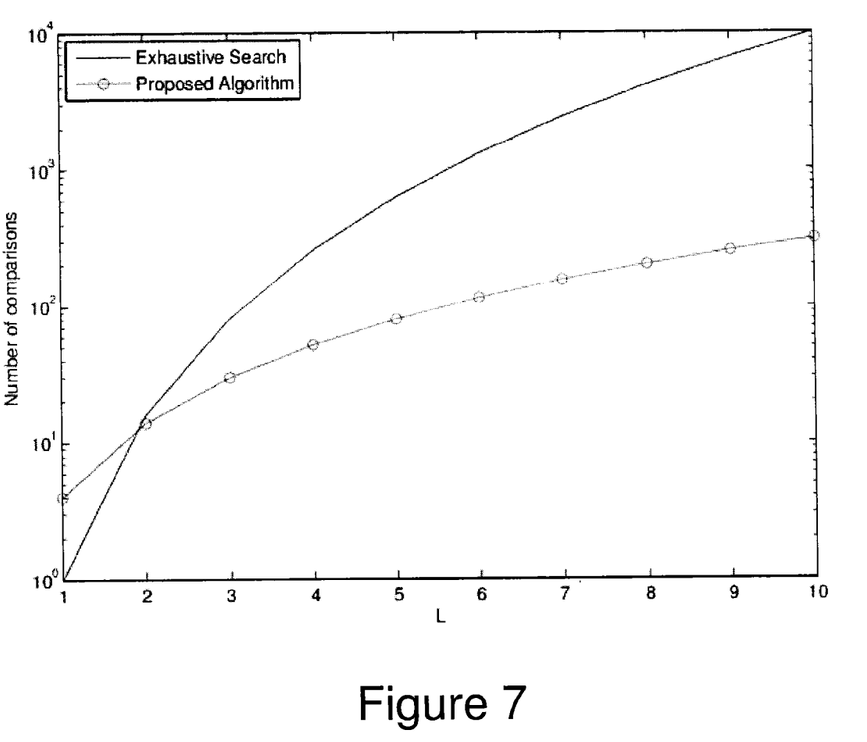
FIG. 7 illustrates the number of comparisons required for different numbers of nodes per stage for exhaustive search and the path selection algorithm used in embodiments.

FIG. 7 illustrates the number of comparisons required for different L for exhaustive search and the path selection algorithm used in embodiments.

In addition, compared to using exhaustive search, no global channel information is required in order to find the optimal path by using embodiments. For each node, only the channel state information between the previous stage and the current stage of all the incoming paths to this node is required. In other words, only the channel state information at the receiver is required at each relay node.

Embodiments using the algorithm described herein have the advantage of low complexity.

One of the reasons for this is that in embodiments each node sends an indication of a path metric for a single path to the nodes in the next stage. This makes the embodiments which use the algorithm scalable since the complexity does not greatly increase when the number of nodes is increased.

Figure 8:
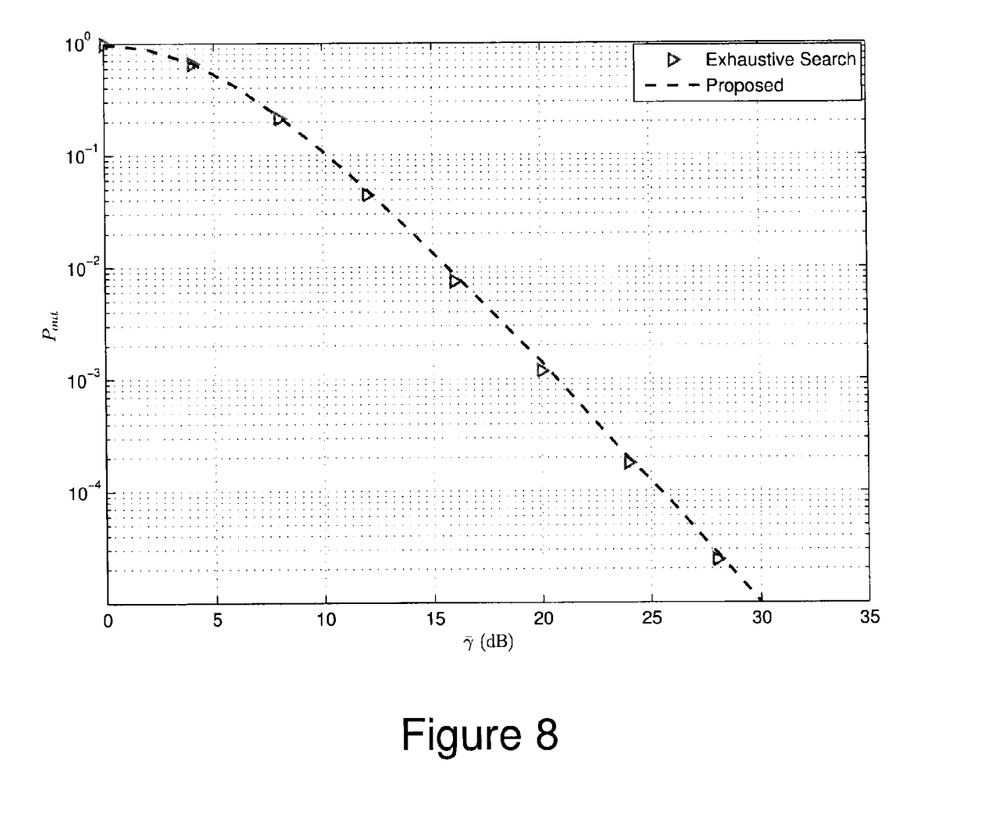
FIG. 8 illustrates the outage probability for paths selected by embodiments compared with the outage probability for paths selected by an exhaustive search.

FIG. 8 shows a comparison of the outage probability for paths selected by embodiments of methods described above and for exhaustive search. This shows that embodiments can achieve the same performance in terms of outage probability as an exhaustive search.

Embodiments are applicable to relay networks with arbitrary number (not necessarily equal) number of relays at each stage, and for any fading channels.

Further, embodiments allow for path selection for relay systems with multiple source/destination nodes. In such a case one source node can perform the path selection first, followed by the path selection of a second source node. These embodiments implement the greedy algorithm. In some application scenarios such as the delay-tolerant networks, source nodes can be scheduled in a way that guarantees no overlaps among the paths they selected (in time, frequency, or space domain).

While certain embodiments have been described, these embodiments have been presented by way of example only, and are not intended to limit the scope of the inventions. Indeed, the novel methods, systems, devices and networks described herein may be embodied in a variety of other forms; furthermore, various omissions, substitutions and changes may be made without departing from the spirit of the inventions. For example, alternative fixed gain amplification factors to that given in equation (4) could be used. The accompanying claims and their equivalents are intended to cover such forms or modifications as would fall within the scope and spirit of the inventions.

The invention claimed is:

1. A wireless relay device comprising:
a receiver configured to receive signals from at least a first wireless device and a second wireless device, and to extract, from a signal received from the first wireless device, an indication of a path metric for a path from a source node to the first wireless device, and from a signal received from the second wireless device, an indication of a path metric for a path from the source node to the second wireless device;
a processor configured to select, using the extracted indications, a path from the source node to the wireless relay device and to determine a path metric for the selected path, wherein the processor is configured to use indications of the effective gain for, respectively, a path between the first wireless device and the wireless relay device, and a path between the second wireless device and the wireless relay device and the extracted indications to select a path from the source node to the wireless relay device, and to determine the path metric for the selected path as the effective gain for the path from one of the first and the second wireless device to the wireless relay device multiplied by the path metric for the path from the source node to the one of the first and the second wireless device minus a quantity proportional to the noise power on the wireless relay device;

a memory configured to store the path metric for the selected path; and a transmitter configured to transmit an indication of the path metric for the selected path to a third wireless device.

2. A wireless device according to claim 1 wherein the processor is configured to use the extracted indications to determine, an optimal path, from a set of paths comprising the path from the source node to the wireless relay device via the first wireless device and the path from the source node to the wireless relay device via the second wireless device, and to select the optimal path.

3. A wireless device according to claim 1 wherein the processor is configured to use indications of channel state information for, respectively, a path between the first wireless device and the wireless relay device, and a path between the second wireless device and the wireless relay device and the extracted indications to select a path from the source node to the wireless relay device.

4. A wireless relay device according to claim 1 configured as an amplify-and-forward wireless relay device.

5. A wireless relay device according to claim 4 configured as a fixed gain amplify-and-forward wireless relay device.

6. A wireless network comprising:
a source node;
a destination node; and
a plurality of wireless relay devices according to claim 1, wherein the destination node is configured to
receive indications of path metrics from at least a first wireless relay device and a second wireless relay device of the plurality of wireless relay devices;
determine, using the received path metrics, an optimal path from the source node to the destination node.

7. A wireless network according to claim 6, configured to send a message along the optimal path from the source node to the destination node.

8. A wireless relay device comprising:
a receiver configured to receive signals from at least a first wireless device and a second wireless device, and to extract, from a signal received from the first wireless device, an indication of a path metric for a path from a source node to the first wireless device, and from a signal received from the second wireless device, an indication of a path metric for a path from the source node to the second wireless device;
a processor configured to select, using the extracted indications, a path from the source node to the wireless relay device and to determine a path metric for the selected path, wherein the processor is configured to calculate a set of products, the set of products comprising for each of the first and the second wireless device the product of the effective channel gain for the path from the wireless device to the wireless relay device multiplied with the path metric for the path from the source node to that wireless device, to compare the products of the set of products to determine a largest product, and to select the path having the largest product as the selected path;

a memory configured to store the path metric for the selected path; and a transmitter configured to transmit an indication of the path metric for the selected path to a third wireless device.

9. A wireless communication method comprising:
receiving, at a wireless relay device, signals from at least a first wireless device and a second wireless device, wherein a signal received from the first wireless device comprises an indication of a path metric for a path from a source node to the first wireless device and a signal received from the second wireless device comprises an indication of a path metric for a path from the source node to the second wireless device;

using the indications received from the first wireless device and the second wireless device to select a path from the set of paths comprising the path from the source node to the wireless relay device via the first wireless device and the path from the source node to the wireless relay device via the second wireless device;

determining a path metric for the selected path, wherein determining a path metric for the selected path comprises multiplying the effective gain for the path from one of the first and the second wireless device to the wireless relay device by the path metric for the path from the source node to the one of the first and the second wireless device and subtracting a quantity proportional to the noise power on the wireless relay device; and transmitting an indication of the path metric for the selected path to a third wireless device.

10. A wireless communication method according to claim 9, comprising determining an optimal path from the set of paths and selecting the optimal path.

11. A wireless communication method according to claim 9, selecting a path comprises calculating a set of products, the set of products comprising for each of the first and the second wireless device the product of the effective channel gain for the path from the wireless device to the wireless relay multiplied with the path metric for the path from the source node to that wireless device, comparing the products of the set of products to determine a maximum product, and selecting the path having the maximum product.

12. A non-transitory computer readable medium carrying computer readable instructions which when executed on a processor cause the processor to perform a method according to claim 9.

* * * * *